US012128590B2

(12) United States Patent
Chang

(10) Patent No.: US 12,128,590 B2
(45) Date of Patent: Oct. 29, 2024

(54) FOAMING APPARATUS FOR A PAPER CONTAINER

(71) Applicant: Ching-Wen Chang, Miaoli County (TW)

(72) Inventor: Ching-Wen Chang, Miaoli County (TW)

( * ) Notice: Subject to any disclaimer, the term of this patent is extended or adjusted under 35 U.S.C. 154(b) by 349 days.

(21) Appl. No.: 17/629,647

(22) PCT Filed: Aug. 9, 2019

(86) PCT No.: PCT/CN2019/099876
§ 371 (c)(1),
(2) Date: Jan. 24, 2022

(87) PCT Pub. No.: WO2021/026670
PCT Pub. Date: Feb. 18, 2021

(65) Prior Publication Data
US 2022/0242016 A1   Aug. 4, 2022

(51) Int. Cl.
*B29C 44/34* (2006.01)
*B29C 44/12* (2006.01)
(Continued)

(52) U.S. Cl.
CPC ...... *B29C 44/3415* (2013.01); *B29C 44/1271* (2013.01); *B29C 44/38* (2013.01); *B29L 2031/7132* (2013.01)

(58) Field of Classification Search
CPC .................................................. B29C 44/3415
See application file for complete search history.

(56) References Cited

U.S. PATENT DOCUMENTS

| 4,004,129 A * | 1/1977 | Hicks | A21B 1/46 |
| | | | 99/443 C |
| 6,328,557 B1 * | 12/2001 | Grishchenko | B29C 44/12 |
| | | | 34/236 |
| 2016/0327339 A1 * | 11/2016 | Lin | B31B 50/00 |

FOREIGN PATENT DOCUMENTS

| CN | 104416707 A | 3/2015 |
| CN | 104416708 A | 3/2015 |

(Continued)

OTHER PUBLICATIONS

Machine translation of CN104416707 (provided with IDS filed Jan. 24, 2022) as found on google patents. (Year: 2024).*

*Primary Examiner* — Edmund H Lee
(74) *Attorney, Agent, or Firm* — Muncy, Geissler, Olds & Lowe, P.C.

(57) ABSTRACT

A foaming apparatus for a paper container (90), including: a main body (10), a delivery mechanism, a plurality of supports (30), a heating mechanism (40), a cooling mechanism (50), a feeding mechanism (60), and a pick-up mechanism (70). The main body (10) is divided into a feeding and pick-up area (13), a preheating area (14), a heating area (15) and a cooling area (16) on a horizontal plane; the delivery mechanism includes a chain (21) in closed circulation; each of the supports (30) is provided with a supporting portion (32) and a base (31); the heating mechanism (40) is disposed on the preheating area (14) and the heating area (15) so as to heat same; the cooling mechanism (50) is disposed on the cooling area (16) so as to cool same; the feeding mechanism (60) and the pick-up mechanism (70) are separately disposed above the feeding and pick-up area (13). Therefore, the foaming apparatus for the paper container (90) can effectively reduce the size of a machine while ensuring sufficient path length to do separate the heating area (15) from the cooling area (16).

10 Claims, 7 Drawing Sheets

(51) Int. Cl.
*B29C 44/38* (2006.01)
*B29L 31/00* (2006.01)

(56) References Cited

FOREIGN PATENT DOCUMENTS

| CN | 104416709 A | 3/2015 |
| EP | 0940240 A2 | 9/1999 |

* cited by examiner

FOAMING APPARATUS FOR A PAPER CONTAINER

BACKGROUND OF THE INVENTION

Field of the Invention

The present invention relates to a foaming apparatus, and particularly to a foaming apparatus for a paper container.

Description of the Prior Art

Generally speaking, the thermal insulation paper container with a foam layer is manufactured by coating the foam material on the outer surface of the paper container, and the paper container is then heated and foamed in a heating device. The foamed paper containers are moved to another place for cooling, and the cooled paper containers are stacked with each other. However, this process is very complicated and time-consuming. The conventional process not only requires the heating device and the cooling device but also manual transportation and collection of the paper containers.

In this regard, a continuous production foaming device has been developed, the heating area and the cooling area are arranged at different positions of the same machine, and the paper container is carried through the heating area and the cooling area by the conveyer belt to carry out continuous production. However, in order to ensure the heating time to be sufficient to foam the paper container, and to ensure that the foamed layer is sufficiently cooled, the heating area and the cooling area must have large extents respectively, which results in a large size of the foaming device.

Therefore, it is indeed an important issue in the industry how to reduce the size of the foaming device with ensuring sufficient foaming and cooling.

SUMMARY OF THE INVENTION

The main object of the present invention is to provide a foaming apparatus for a paper container which effectively minimizes the size of the foaming apparatus, provides relatively large length of the chain as much as possible, and provides a heating area with high heating efficiency and a cooling area with high cooling efficiency.

To achieve the above and other objects, a foaming apparatus for a paper container, including: a main body, the main body being divided into a feeding and pick-up area, a preheating area, a heating area and a cooling area on a horizontal plane, wherein the preheating area, the heating area and the cooling area each include a guiding portion arranged thereinside; a delivery mechanism, the delivery mechanism including a chain in closed circulation, the chain extending on the horizontal plane, extending along the feeding and pick-up area, the preheating area, the heating area and cooling area in sequence, and extending back to the feeding and pick-up area, the chain extending zigzag within the preheating area, the heating area and the cooling area, respectively, so that the chain extends back and forth within respective one of the preheating area, the heating area and the cooling area; a plurality of supports, each of the plurality of supports including a supporting portion and a base, the bases of the plurality of supports being connected to a side of the chain in intervals, the supporting portion being rotatably disposed on the base and configured to support the paper container, wherein when each of the plurality of supports moves with the chain within the preheating area, the heating area and the cooling area, the guiding portion and the supporting portion frictionally contact with each other so that the supporting portion rotates; a heating mechanism, arranged within the preheating area and the heating area to heat the preheating area and the heating area, the temperature in the preheating area being lower than the temperature in the heating area; a cooling mechanism, arranged within the cooling area to cool the cooling area; a feeding mechanism and a pick-up mechanism, arranged correspondingly above the feeding and pick-up area, the feeding mechanism being adjacent to the preheating area, the pick-up mechanism being adjacent to the cooling area, the feeding mechanism placing the paper container on the supporting portion of each of the plurality of supports, the pick-up mechanism picking up the paper container from the supporting portion of each of the plurality of supports.

Preferably, the main body includes a front side and a rear side, the front side and the rear side define a longitudinal direction, a lateral direction is defined as to be perpendicular to the longitudinal direction, the longitudinal direction and the lateral direction are parallel to the horizontal plane, the feeding and pick-up area is located at the front side of the main body, and the preheating area, the heating area and the cooling area are arranged along the lateral direction and located after the feeding and pick-up area.

Preferably, the chain extends along the lateral direction in the feeding and pick-up area, the chain extends to be in a U-shaped manner in the longitudinal direction in the preheating area, the heating area and the cooling area, the chain extends to be in a U-shaped manner between the preheating area and the heating area, the chain extends to be in a U-shaped manner between the heating area and the cooling area, the chain extends to be in a L-shaped manner between the feeding and pick-up area and the preheating area, and the chain extends to be in a L-shaped manner between the cooling area and the feeding and pick-up area.

Preferably, turnings of the chain within the preheating area, the heating area and the cooling area are adjacent to the rear end of the main body, the turn of the chain between the preheating area and the heating area is adjacent to the feeding and pick-up area, and the turning of the chain between the heating area and the cooling area is adjacent to the feeding and pick-up area.

Preferably, the chain extends to be in a W-shaped manner within the cooling area in the longitudinal direction.

Preferably, the delivery mechanism further includes a plurality of gears, the plurality of gears are arranged at opposite ends of the preheating area in the longitudinal direction, the heating area and the cooling area and at opposite ends of the feeding and pick-up area in the lateral direction, the plurality of gears are meshed with the chain, and the plurality of gears rotate to drive the chain.

Preferably, the heating mechanism includes a plurality of heating plates and a plurality of air-feeding openings, the plurality of heating plates are arranged within the preheating area and the heating area and located correspondingly above the plurality of supports, the plurality of air-feeding openings are arranged within the preheating area and the heating area and located correspondingly above the heating plate so that airflow is heated by the plurality of heating plates and flows to the plurality of supports.

Preferably, the cooling mechanism includes at least one fan and at least one vent, the at least one fan forces airflow to the cooling area, and the at least one vent is configured for venting the airflow heated within the cooling area.

Preferably, the pick-up mechanism is configured to suck the paper container.

Preferably, the chain extends to be in a W-shaped manner within the cooling area in the longitudinal direction; the delivery mechanism further includes a plurality of gears, the plurality of gears are arranged at opposite ends of the preheating area in the longitudinal direction, the heating area and the cooling area and at opposite ends of the feeding and pick-up area in the lateral direction, the plurality of gears are meshed with the chain, and the plurality of gears rotate to drive the chain; the heating mechanism includes a plurality of heating plates and a plurality of air-feeding openings, the plurality of heating plates are arranged within the preheating area and the heating area and located correspondingly above the plurality of supports, the plurality of air-feeding openings are arranged within the preheating area and the heating area and located correspondingly above the heating plate so that airflow is heated by the plurality of heating plates and flows to the plurality of supports; the cooling mechanism includes at least one fan and at least one vent, the at least one fan forces airflow to the cooling area, and the at least one vent is configured for venting the airflow heated within the cooling area; the pick-up mechanism is configured to suck the paper container; the main body further includes an air circulation system, the air circulation system includes intake mechanisms and outtake mechanisms, the preheating area, the heating area and the cooling area each include one of the intake mechanisms and one of the outtake mechanisms; a first partition is arranged between the preheating area and the heating area, and a second partition is arranged between the heating area and the cooling area.

10: main body; 11: cover; 111: first plate; 112: second plate; 113: third plate; 12: base body; 121: first partition; 122: second partition; 123: third partition; 124: fourth partition; 13: feeding and pick-up area; 14: preheating area; 15: heating area; 151: main heating area; 152: temperature-lowering area; 16: cooling area; 17: rail; 171: guiding groove; 18: abutting surface; 20: delivery mechanism; 21: chain; 22: gear; 30: support; 31: base; 32: supporting portion; 321: gear; 33: bearing; 40: heating mechanism; 41: heating plate; 42: air-feeding opening; 50: cooling mechanism; 51: fan; 52: vent; 60: feeding mechanism; 70: pick-up mechanism; 80: air circulation system; 90: paper container.

DETAILED DESCRIPTION OF THE PREFERRED EMBODIMENTS

Figure 1:
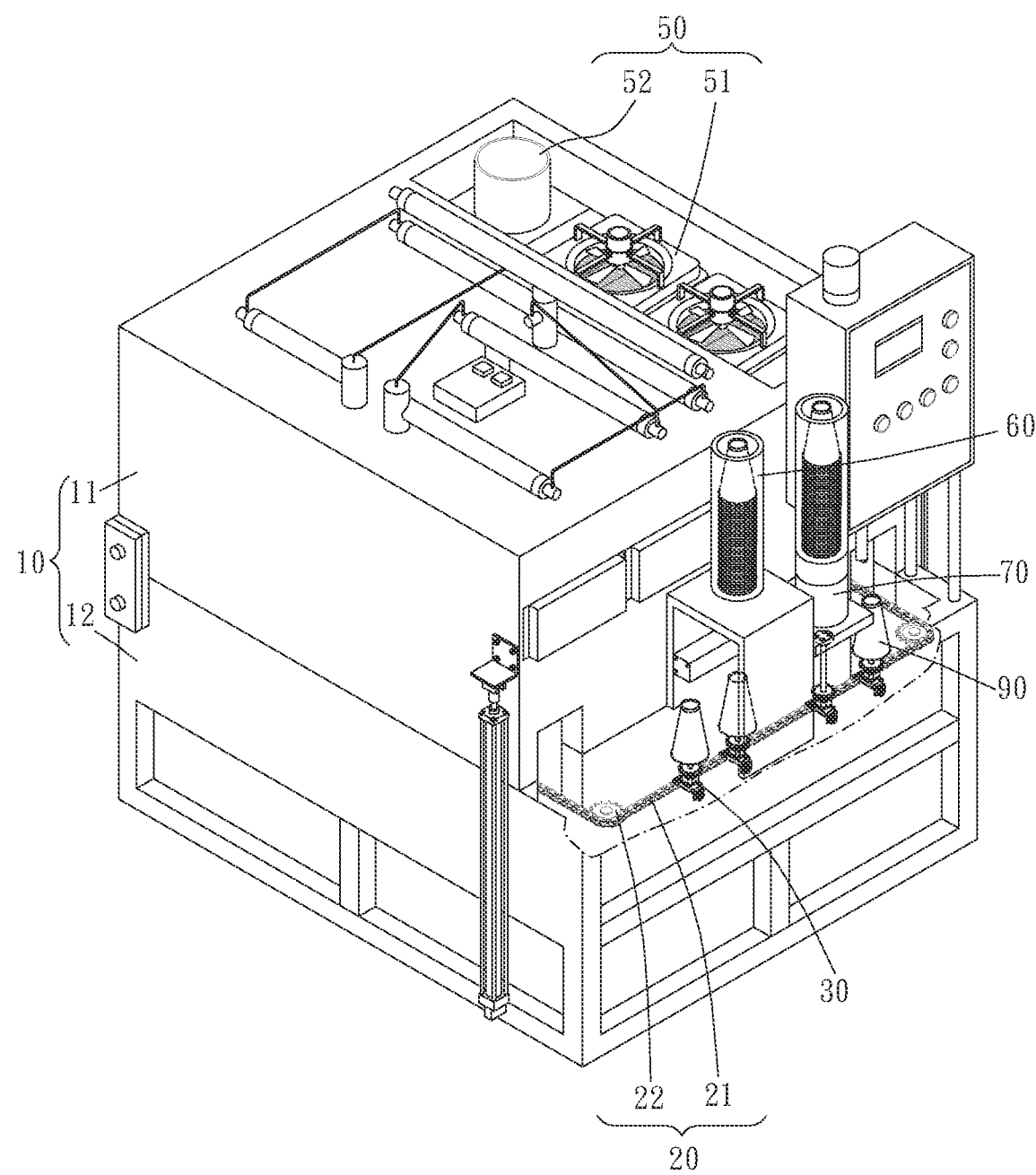
FIG. 1 is a stereogram of a preferable embodiment of the present invention.
Figure 2:
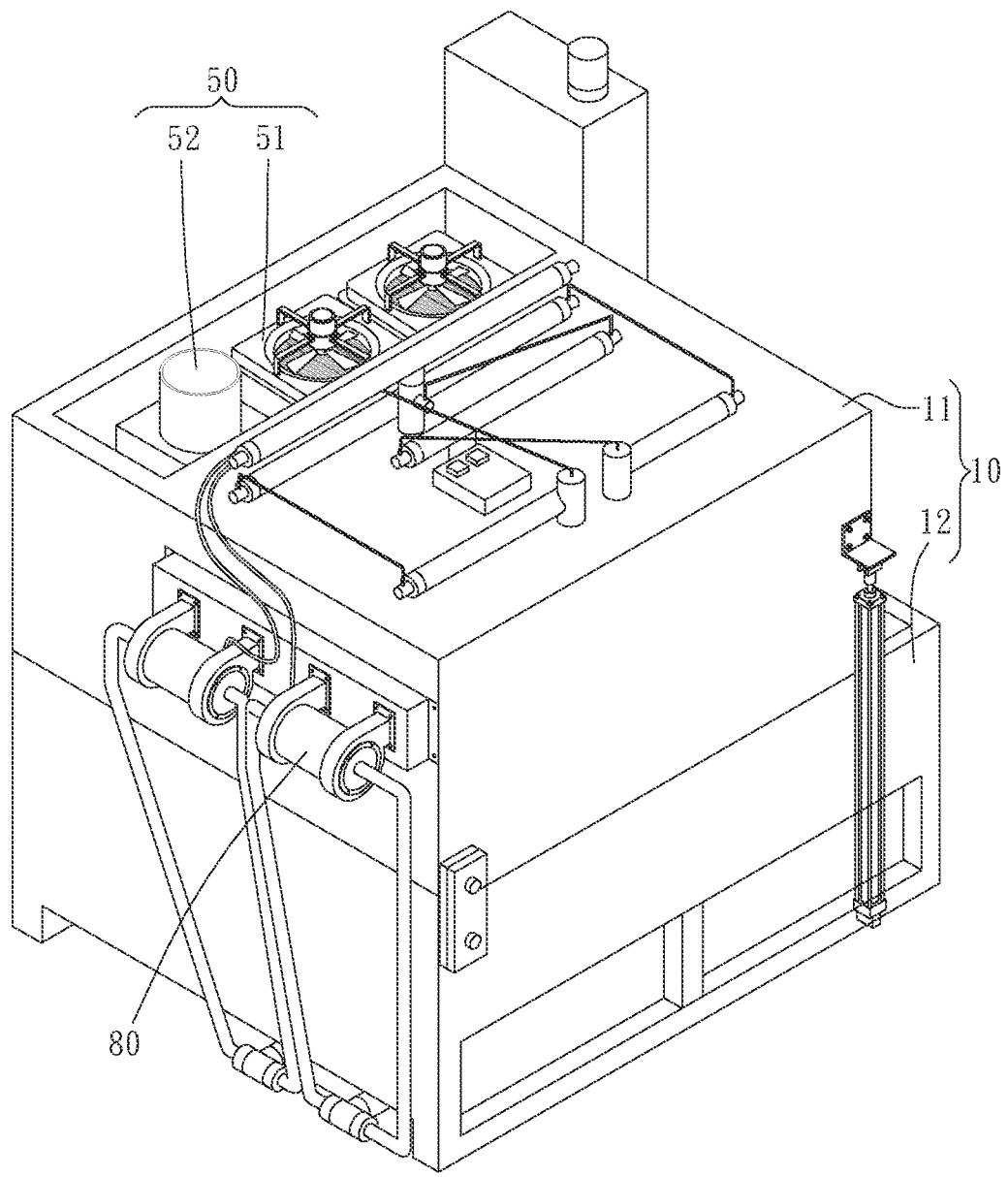
FIG. 2 is another stereogram of a preferable embodiment of the present invention.
Figure 3:
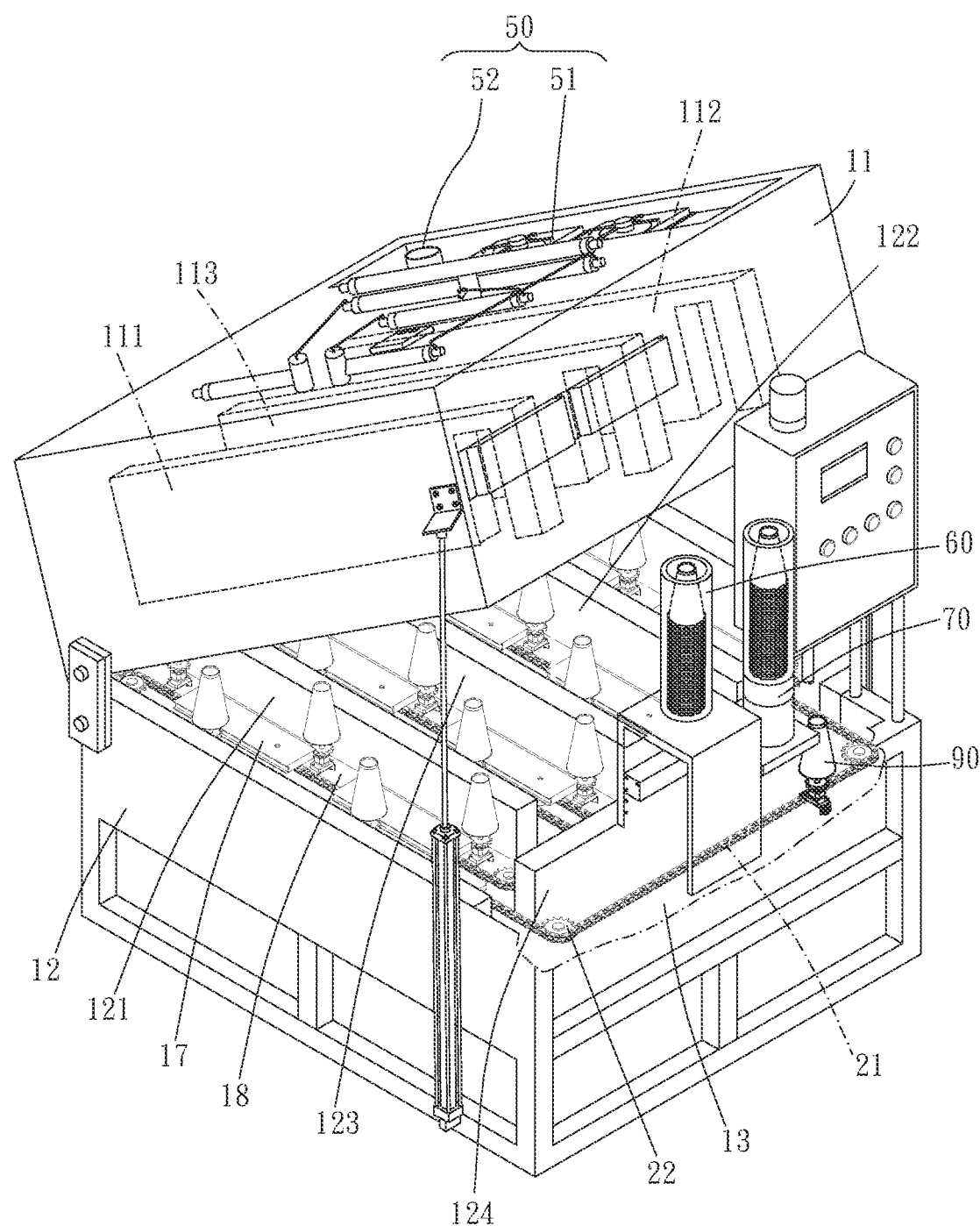
FIG. 3 is a stereogram showing a foaming apparatus with its cover open according to a preferable embodiment of the present invention.
Figure 4:
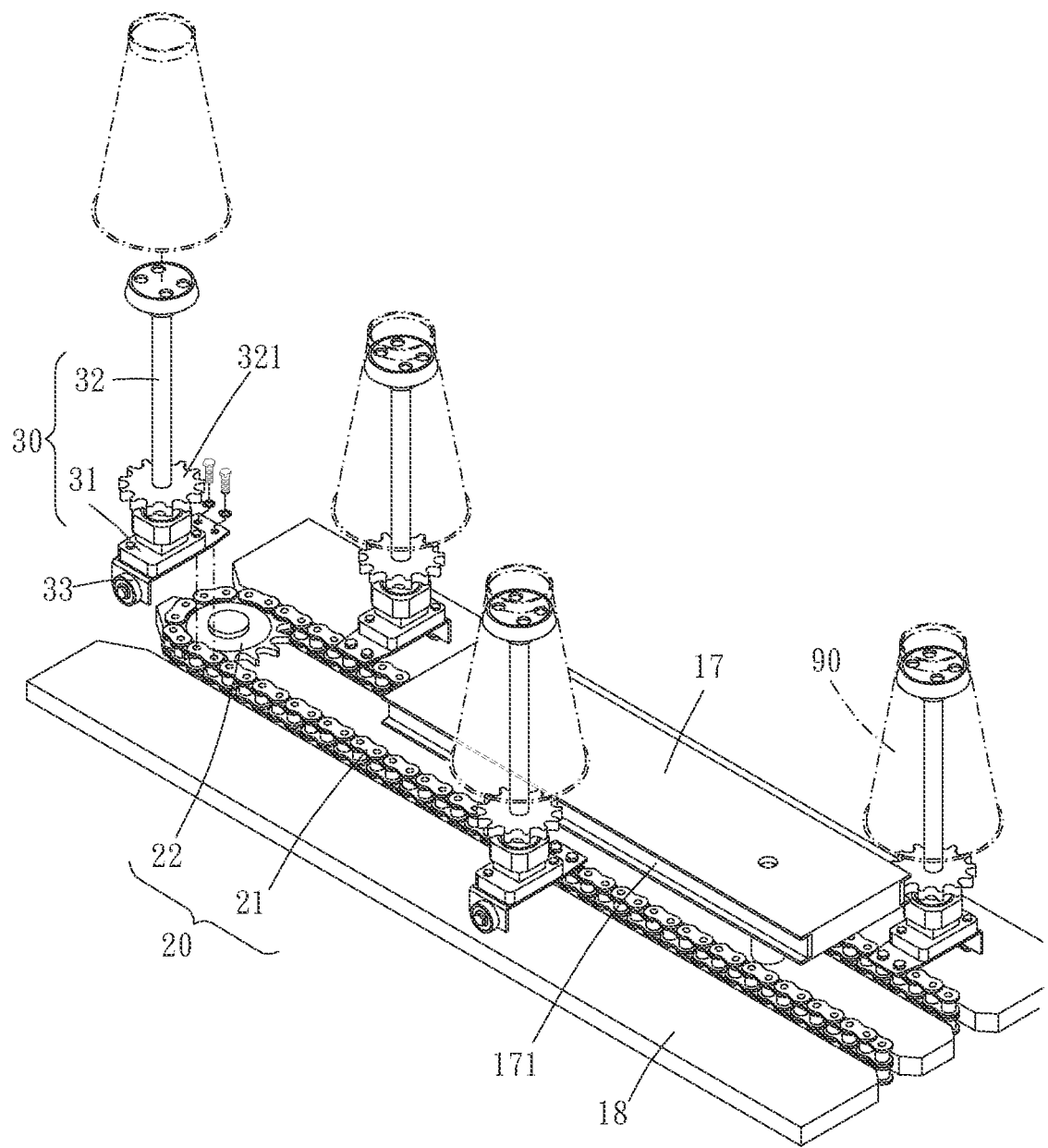
FIG. 4 is a partial perspective view of a preferable embodiment of the present invention.
Figure 5:
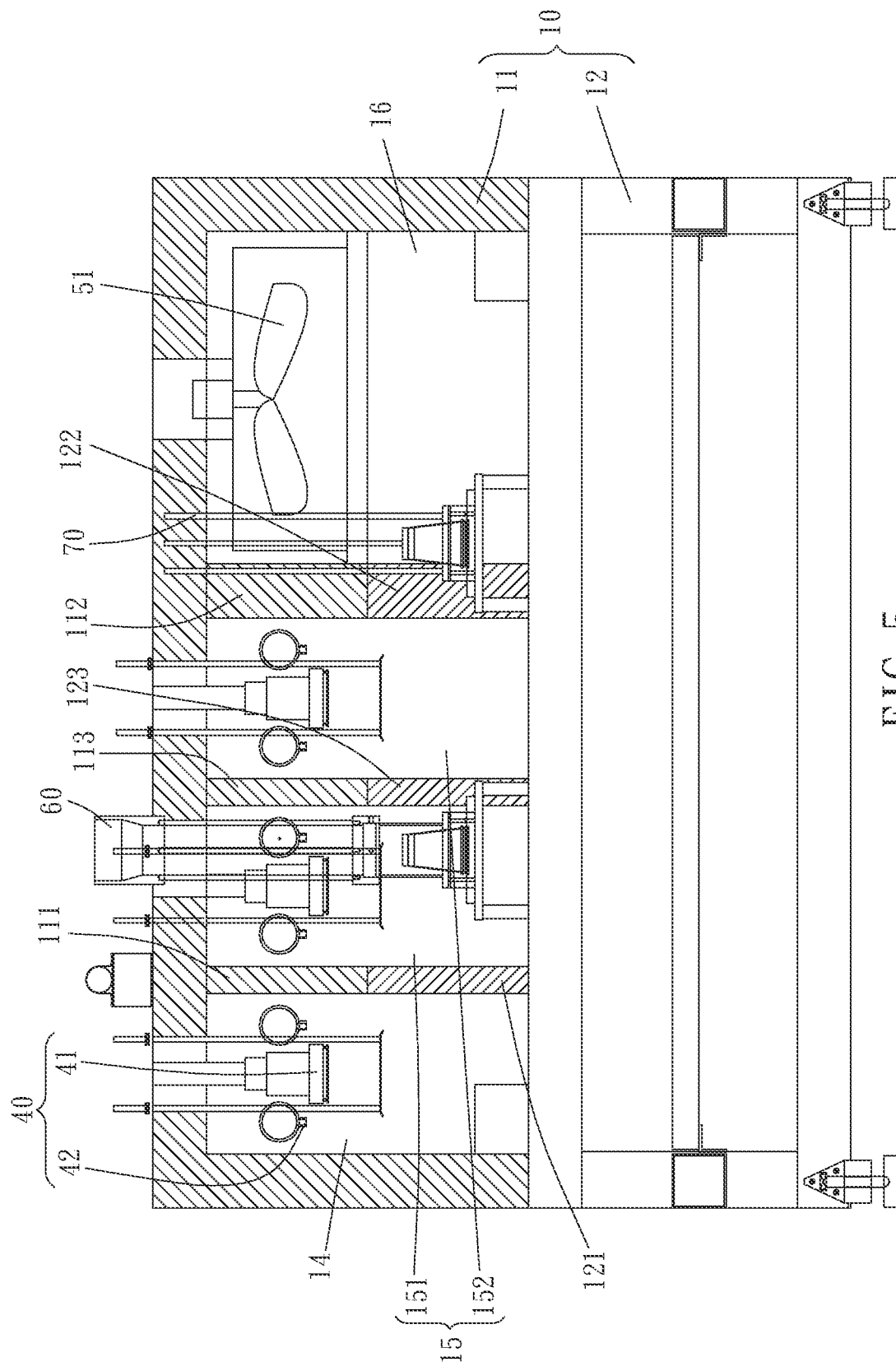
FIG. 5 is a cross-sectional view taken along a lateral direction according to a preferable embodiment of the present invention.
Figure 6:
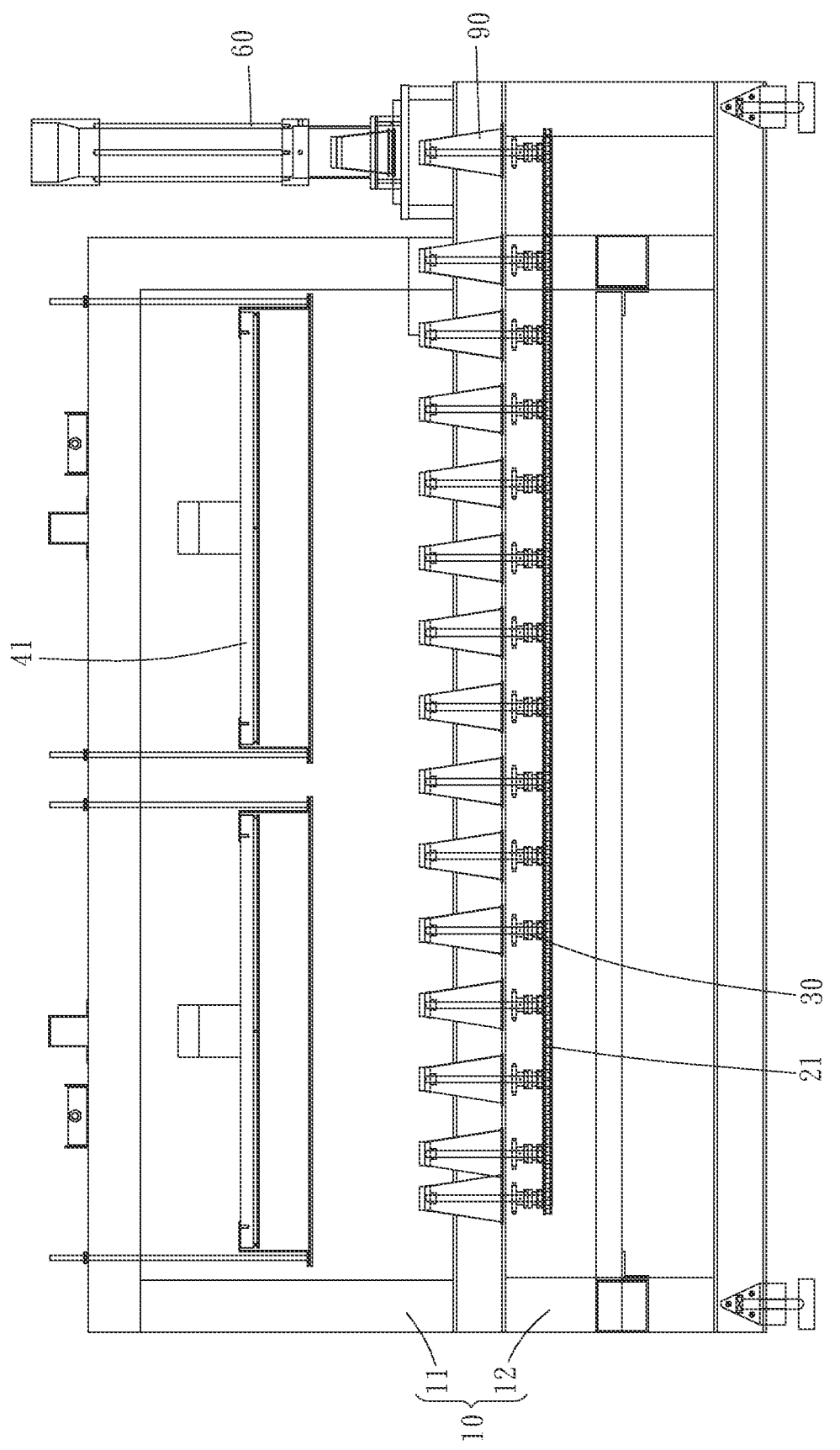
FIG. 6 is a cross-sectional view taken along a longitudinal direction according to a preferable embodiment of the present invention.
Figure 7:
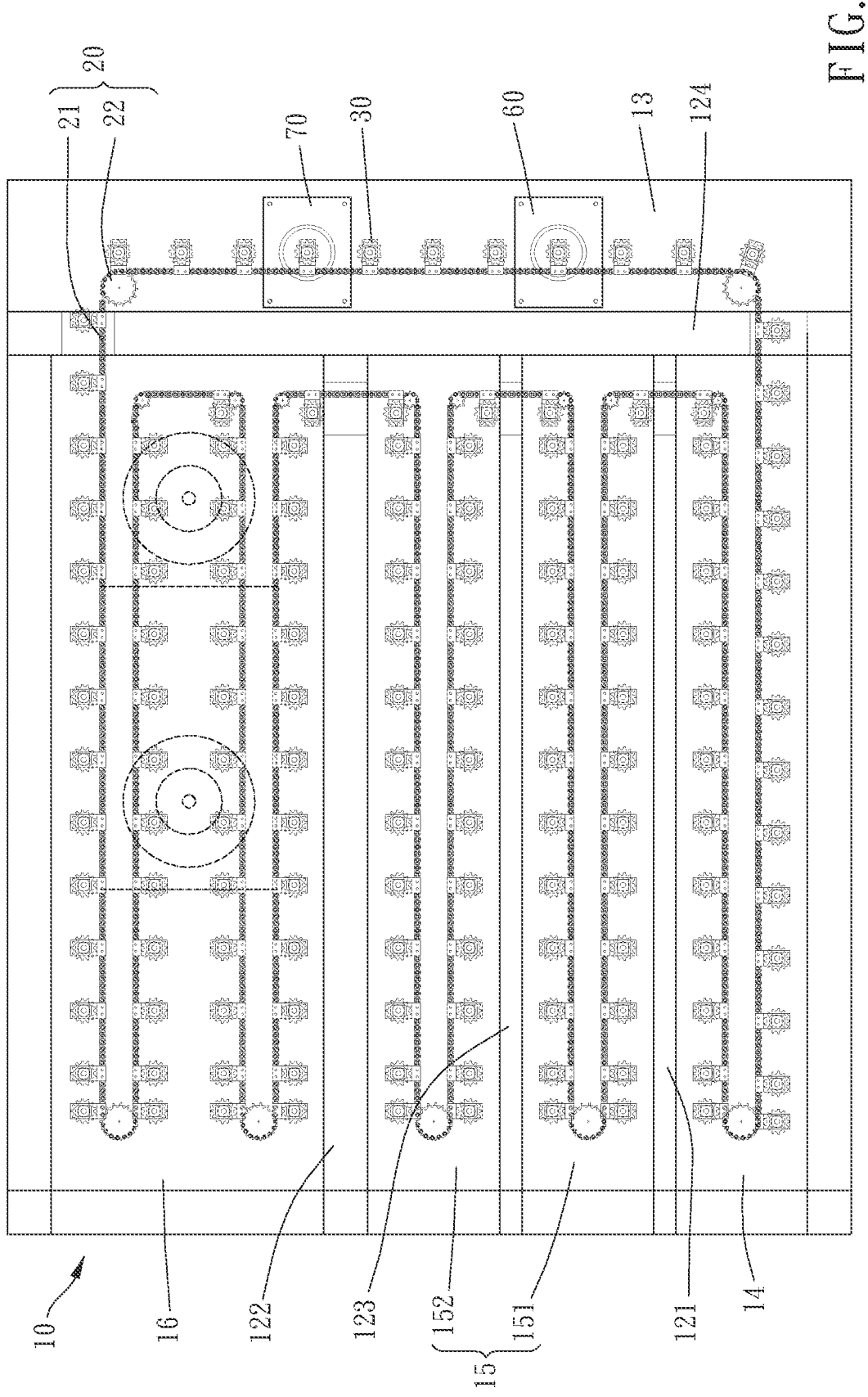
FIG. 7 is a top view of a preferable embodiment of the present invention.

Please refer to FIGS. 1 to 7 for a preferable embodiment of the present invention. A foaming apparatus for a paper container of the present invention includes a main body 10, a delivery mechanism 20, a plurality of supports 30, a heating mechanism 40, a cooling mechanism 50, a feeding mechanism 60 and a pick-up mechanism 70.

The main body 10 is divided into a feeding and pick-up area 13 on a horizontal plane. The preheating area 14, a heating area 15 and a cooling area 16, the preheating area 14, the heating area 15 and the cooling area 16 each include a guiding portion arranged thereinside. A first partition 121 is arranged between the preheating area 14 and the heating area 15, and a second partition 122 is arranged between the heating area 15 and the cooling area 16. The delivery mechanism 20 includes a chain 21 in closed circulation. The chain 21 extends on the horizontal plane, extends along the feeding and pick-up area 13, the preheating area 14, the heating area 15 and the cooling area 16 in sequence, and extends back to the feeding and pick-up area 13. The chain 21 extends zigzag within the preheating area 14, the heating area 15 and the cooling area 16, respectively, so that the chain 21 extends back and forth within respective one of the preheating area 14, the heating area 15 and the cooling area 16. Each of the plurality of supports 30 includes a supporting portion 32 and a base 31, the bases of the plurality of supports 30 are connected to a side of the chain 21 in intervals, and the supporting portion 32 is rotatably disposed on the base 31 and configured to support the paper container 90. When each of the plurality of supports 30 moves with the chain 21 within the preheating area 14, the heating area 15 and the cooling area 16, the guiding portion and the supporting portion 32 frictionally contact with each other so that the supporting portion 32 rotates. The heating mechanism 40 includes at least two heating plates 41 arranged respectively within the preheating area 14 and the heating area 15 to heat the preheating area 14 and the heating area 15, wherein the temperature in the preheating area 14 is lower than the temperature in the heating area 15. Within the preheating area 14, the chain 21 extends along a longitudinal direction of the heating plate 41 in the preheating area 14; within the heating area 15, the chain 21 extends along a longitudinal direction of the heating plate 41 in the heating area 15. The cooling mechanism 50 is arranged within the cooling area 16 to cool the cooling area 16. The feeding mechanism 60 and the pick-up mechanism 70 are arranged correspondingly above the feeding and pick-up area 13. Relatively, the feeding mechanism 60 is adjacent to the preheating area 14, and the pick-up mechanism 70 is adjacent to the cooling area 16. The feeding mechanism 60 places the paper container 90 on the supporting portion 32 of each of the plurality of supports 30, and the pick-up mechanism 70 picks up the paper container 90 on the supporting portion 32 of each of the plurality of supports 30.

In this embodiment, the main body 10 includes a front side and a rear side, the front side and the rear side define a longitudinal direction, a lateral direction is defined as to be perpendicular to the longitudinal direction, the longitudinal direction and the lateral direction are parallel to the horizontal plane, the feeding and pick-up area 13 is located at the front side of the main body 10, and the preheating area 14, the heating area 15 and the cooling area 16 are arranged along the lateral direction and located after the feeding and pick-up area 13. The chain 21 extends along the lateral direction in the feeding and pick-up area 13, the chain 21 extends to be in a U-shaped manner in the longitudinal direction in the preheating area 14, the heating area 15 and the cooling area 16, the chain 21 extends to be in a U-shaped manner between the preheating area 14 and the heating area 15, the chain 21 extends to be in a U-shaped manner between the heating area 15 and the cooling area 16, the chain 21 extends to be in a L-shaped manner between the feeding and pick-up area 13 and the preheating area 14, and the chain 21 extends to be in a L-shaped manner between the cooling area 16 and the feeding and pick-up area 13.

Preferably, turnings of the chain 21 within the preheating area 14, the heating area 15 and the cooling area 16 are adjacent to the rear end of the main body 10, the turn of the chain 21 between the preheating area 14 and the heating area 15 is adjacent to the feeding and pick-up area 13, and the turning of the chain 21 between the heating area 15 and the cooling area 16 is adjacent to the feeding and pick-up area 13. Preferably, the chain 21 extends to be in a W-shaped manner within the cooling area 16 in the longitudinal direction, which provides a longer period of time for cooling.

Specifically, the delivery mechanism 20 further includes a plurality of gears 22, the plurality of gears 22 are arranged at opposite ends of the preheating area 14, the heating area 15 and the cooling area 16 in the longitudinal direction, the feeding and pick-up area 13 are arranged at opposite ends of the feeding and pick-up area 13 in the lateral direction, the plurality of gears 22 are meshed with the chain 21, and the plurality of gears 22 rotate to drive the chain 21.

The heating mechanism 40 further includes a plurality of air-feeding openings 42, the plurality of heating plates 41 are arranged within the preheating area 14 and the heating area 15 and located correspondingly above the plurality of supports 30, and the plurality of air-feeding openings 42 are arranged within the preheating area 14 and the heating area 15 and located correspondingly above the heating plate 41 so that airflow is heated by the plurality of heating plates 41 and flows to the plurality of supports 30. The cooling mechanism 50 includes at least one fan 51 and at least one vent 52, the fan 51 forces airflow to the cooling area 16, and the at least one vent 52 is configured for venting the airflow heated within the cooling area 16. The pick-up mechanism 70 is configured to suck the paper container 90 on the support 30. The main body 10 further includes an air circulation system 80, and the air circulation system 80 includes intake mechanisms and outtake mechanisms. The preheating area 14, the heating area 15 and the cooling area 16 each include one of the intake mechanisms and one of the outtake mechanisms, thereby directing the airflow in the preheating area 14, the heating area 15 and the cooling area 16.

In this embodiment, the heating area 15 includes a main heating area 151 and a temperature-lowering area 152, the main heating area 151 is adjacent to the preheating area 14, the temperature-lowering area 152 is adjacent to the cooling area 16, and the temperature in the temperature-lowering area 152 is lower than the temperature in the main heating area 151. A third partition 123 is arranged between the main heating area 151 and the temperature-lowering area 152. A fourth partition 124 is arranged at a side of the feeding and pick-up area 13 adjacent to the rear side, so that the feeding and pick-up area 13 is arranged outside the preheating area 14, the heating area 15 and the cooling area 16.

Specifically, the main body 10 includes a base body 12 and a cover 11, and the cover 11 is rotatably connected to the base body 12. The chain 21, the plurality of supports 30, the first partition 121, the second partition 122, the third partition 123, and the fourth partition 124 are disposed on the base body 12. A first plate 111, a second plate 112 and a third plate 113 are disposed on a side of the cover 11 facing toward the base body 12. The first plate 111, second plate 112 and third plate 113 correspond to the first partition 121, second partition 122 and third partition 123, respectively. The first plate 111, the second plate 112, the third plate 113, the first partition 121, the second partition 122 and the third partition 123 extend in the longitudinal direction. When the cover 11 covers the base body 12, the first plate 111 and the first partition 121 are abutted against each other, the second plate 112 and the second partition 122 are abutted against each other, and the third plate 113 and the third partition 123 are abutted against each other. The main body 10 further includes a heat dissipation hole between and above the preheating area 14 and the feeding and pick-up area 13, which prevents hot airflow in the preheating area 14 from flowing to the feeding and pick-up area 13 and the atmosphere.

Preferably, the first partition 121 and the fourth partition 124 are distanced to form a space therebetween, the second partition 122 and the fourth partition 124 are distanced to form a space therebetween, and the third partition 123 and the fourth partition 124 are distanced to form a space therebetween, so that the chain 21 is allowed to pass through the spaces. Two ends of the fourth partition 124 on the lateral direction are distanced from the main body 10 to form a space allowing the chain 21 to pass therethrough. A front side of the cover 11 corresponds to the fourth partition 124. When the cover 11 covers the base body 12, the front side of the cover 11 and the fourth partition 124 are abutted against each other, substantially sealing the preheating area 14, the heating area 15 and the cooling area 16.

In this embodiment, the supporting portion 32 of each of the plurality of supports 30 includes a gear 321, the guiding portion includes at least two guiding grooves 171, the gear 321 is engaged within and guided along one of the at least two guiding grooves 171 (the guiding groove 171 may be provided with a member or layer for increasing friction), so that the supporting portion 32 can rotate relative to the guiding portion, and any area of the paper container 90 can be heated evenly. A rail 17 within any of the preheating area 14, and the heating area 15 and the cooling area 16 includes two guiding grooves 171 at opposite side. Each rail 17 is meshed with and between two sections of the chain 21 in any of the preheating area 14, the heating area 15 and the cooling area 16. The foaming apparatus further includes a plurality of abutting surfaces 18 beside the chain 21 within the preheating area 14, the heating area 15 and the cooling area 16. The plurality of abutting surfaces 18 are located under the plurality of supports 30. Each of the plurality of supports 30 includes a bearing 33, and the bearing 33 is rotatable about an axis parallel to the horizontal plane and is abutted against the abutting surface 18. When the support 30 is driven by the chain 21, the bearing 33 rotates on the abutting surface 18. The bearing 33 can also support the support 30, which prevents the support 30 from tilting.

In operation, the plurality of gears 22 are driven by a driving device and drive the chain 21 to move along the feeding and pick-up area 13, the preheating area 14, the heating area 15, the cooling area 16 and the feeding and pick-up area 13; the feeding mechanism 60 places a paper container to be foamed on the supporting portion 32 of each support 30; the support 30 moves zigzag and through the preheating area 14 and the heating area 15 in sequence so that the paper container is heated to foam; the paper container which is foamed moves through the cooling area 16 and is well cooled; and the paper container which is cooled moves to the feeding and pick-up area 13 and is picked up and collected by the pick-up mechanism 70.

With the above structure, it can provide the relatively largest length of the chain as much as possible within the relatively smallest size of the foaming apparatus. Therefore, even if the feeding and pick-up area, preheating area, heating area and cooling area are close to each other, the paper container can still be well heated and well foamed; and there is sufficient time to cool the paper container in the cooling area, so that the pick-up mechanism can stack paper containers. In addition, the partitions divide the interior of the foaming apparatus into areas, which prevents air from flowing among the areas freely. Therefore, the temperature of the heating area is easy to maintain, and the temperature of the cooling area and preheating area will not be too high; on the other hand, the heating plate extends along the advancing direction of the support so that the paper container can be continuously and uniformly heated when advancing.

Industrial Applicability:

The foaming apparatus for a paper container includes a main body, a delivery mechanism, a plurality of supports, a heating mechanism, a cooling mechanism, a feeding mechanism and a pick-up mechanism, which effectively minimizes the size of the foaming apparatus, provides relatively large length of the chain as much as possible, and provides a heating area with high heating efficiency and a cooling area with high cooling efficiency, so it has industrial applicability.

What is claimed is:

1. A foaming apparatus for a paper container, including:
    a main body, the main body being divided into a feeding and pick-up area, a preheating area, a heating area and a cooling area on a horizontal plane, wherein the preheating area, the heating area and the cooling area each include a guiding portion arranged thereinside;
    a delivery mechanism, the delivery mechanism including a chain in closed circulation, the chain extending back and forth on the horizontal plane, extending along the feeding and pick-up area, the preheating area, the heating area and cooling area in sequence, and extending back to the feeding and pick-up area, the chain extending zigzag within the preheating area, the heating area and the cooling area, respectively, so that the chain extends back and forth within respective one of the preheating area, the heating area and the cooling area;
    a plurality of supports, each of the plurality of supports including a supporting portion and a base, the bases of the plurality of supports being connected to a side of the chain in intervals, the supporting portion being rotatably disposed on the base and configured to support the paper container, wherein when each of the plurality of supports moves with the chain within the preheating area, the heating area and the cooling area, the guiding portion and the supporting portion frictionally contact with each other so that the supporting portion rotates;
    a heating mechanism, arranged within the preheating area and the heating area to heat the preheating area and the heating area, the temperature in the preheating area being lower than the temperature in the heating area;
    a cooling mechanism, arranged within the cooling area to cool the cooling area; and
    a feeding mechanism and a pick-up mechanism, arranged correspondingly above the feeding and pick-up area, the feeding mechanism being adjacent to the preheating area, the pick-up mechanism being adjacent to the cooling area, the feeding mechanism placing the paper container on the supporting portion of each of the plurality of supports, the pick-up mechanism picking up the paper container from the supporting portion of each of the plurality of supports;
    wherein a first partition is arranged between the preheating area and the heating area, and a second partition is arranged between the heating area and the cooling area;
    wherein the heating area includes a main heating area and a temperature-lowering area, the main heating area is adjacent to the preheating area, the temperature-lowering area is adjacent to the cooling area, the temperature in the temperature-lowering area is lower than the temperature in the main heating area, and a third partition is arranged between the main heating area and the temperature-lowering area;
    wherein the main body includes a base body and a cover, and the cover is rotatably connected to the base body; the chain, the plurality of supports, the first partition, the second partition and the third partition are disposed on the base body; a first plate, a second plate and a third plate are disposed on a side of the cover facing toward the base body; the first plate, second plate and third plate correspond to the first partition, second partition and third partition, respectively; the main body includes a front side and a rear side, the front side and the rear side define a longitudinal direction; the first plate, the second plate, the third plate, the first partition, the second partition and the third partition extend in the longitudinal direction; when the cover covers the base body, the first plate and the first partition are abutted against each other, the second plate and the second partition are abutted against each other, and the third plate and the third partition are abutted against each other.

2. The foaming apparatus of claim 1, wherein a lateral direction is defined as to be perpendicular to the longitudinal direction, the longitudinal direction and the lateral direction are parallel to the horizontal plane, the feeding and pick-up area is located at the front side of the main body, and the preheating area, the heating area and the cooling area are arranged along the lateral direction and located after the feeding and pick-up area.

3. The foaming apparatus of claim 2, wherein the chain extends along the lateral direction in the feeding and pick-up area, the chain extends to be in a U-shaped manner in the longitudinal direction in the preheating area, the heating area and the cooling area, the chain extends to be in a U-shaped manner between the preheating area and the heating area, the chain extends to be in a U-shaped manner between the heating area and the cooling area, the chain extends to be in a L-shaped manner between the feeding and pick-up area and the preheating area, and the chain extends to be in a L-shaped manner between the cooling area and the feeding and pick-up area.

4. The foaming apparatus of claim 3, wherein turnings of the chain within the preheating area, the heating area and the cooling area are adjacent to the rear end of the main body, the turn of the chain between the preheating area and the heating area is adjacent to the feeding and pick-up area, and the turning of the chain between the heating area and the cooling area is adjacent to the feeding and pick-up area.

5. The foaming apparatus of claim 3, wherein the chain extends to be in a W-shaped manner within the cooling area in the longitudinal direction.

6. The foaming apparatus of claim 3, wherein the delivery mechanism further includes a plurality of gears, the plurality of gears are arranged at opposite ends of the preheating area in the longitudinal direction, the heating area and the cooling area and at opposite ends of the feeding and pick-up area in the lateral direction, the plurality of gears are meshed with the chain, and the plurality of gears rotate to drive the chain.

7. The foaming apparatus of claim 1, wherein the heating mechanism includes a plurality of heating plates and a plurality of air-feeding openings, the plurality of heating plates are arranged within the preheating area and the heating area and located correspondingly above the plurality of supports, the plurality of air-feeding openings are arranged within the preheating area and the heating area and located correspondingly above the heating plate so that airflow is heated by the plurality of heating plates and flows to the plurality of supports.

8. The foaming apparatus of claim 1, wherein the cooling mechanism includes at least one fan and at least one vent, the at least one fan forces airflow to the cooling area, and the at least one vent is configured for venting the airflow heated within the cooling area.

9. The foaming apparatus of claim 1, wherein the pick-up mechanism is configured to suck the paper container.

10. The foaming apparatus of claim 4, wherein the chain extends to be in a W-shaped manner within the cooling area in the longitudinal direction; the delivery mechanism further includes a plurality of gears, the plurality of gears are arranged at opposite ends of the preheating area in the longitudinal direction, the heating area and the cooling area are arranged at opposite ends of the feeding and pick-up area in the lateral direction, the plurality of gears are meshed with the chain, and the plurality of gears rotate to drive the chain; the heating mechanism includes a plurality of heating plates and a plurality of air-feeding openings, the plurality of heating plates are arranged within the preheating area and the heating area and located correspondingly above the plurality of supports, the plurality of air-feeding openings are arranged within the preheating area and the heating area and located correspondingly above the heating plate so that airflow is heated by the plurality of heating plates and flows to the plurality of supports; the cooling mechanism includes at least one fan and at least one vent, the at least one fan forces airflow to the cooling area, and the at least one vent is configured for venting the airflow heated within the cooling area; the pick-up mechanism is configured to suck the paper container; the main body further includes an air circulation system, the air circulation system includes intake mechanisms and outtake mechanisms, the preheating area, the heating area and the cooling area each include one of the intake mechanisms and one of the outtake mechanisms.

* * * * *